United States Patent [19]
Kawanishi et al.

[11] Patent Number: 5,647,988
[45] Date of Patent: Jul. 15, 1997

[54] METHOD OF BACK-WASHING SUBMERGED-TYPE CERAMIC MEMBRANE SEPARATION APPARATUS

[75] Inventors: Toshio Kawanishi; Shigeki Yokoyama; Katsuro Ishihara; Yoshihisa Narukami; Masahiko Shioyama; Mikiharu Tokushima; Toshiya Ozaki, all of Osaka, Japan

[73] Assignee: Kubota Corporation, Japan

[21] Appl. No.: 349,014

[22] Filed: Dec. 2, 1994

[30] Foreign Application Priority Data

May 30, 1994 [JP] Japan .................................. 6-115783

[51] Int. Cl.⁶ .................................................. B01D 62/02
[52] U.S. Cl. ........................ 210/636; 210/791; 210/739; 210/741; 210/321.69
[58] Field of Search ........................ 210/636, 739, 210/741, 791, 321.69, 106, 108; 134/10

[56] References Cited

U.S. PATENT DOCUMENTS

| | | | |
|---|---|---|---|
| 4,946,602 | 8/1990 | Ekeberg et al. | 210/785 |
| 4,980,066 | 12/1990 | Slegers | 210/636 |
| 5,006,253 | 4/1991 | Slegers | 210/636 |
| 5,043,071 | 8/1991 | Anselme et al. | 210/636 |
| 5,066,402 | 11/1991 | Anselme et al. | 210/636 |
| 5,152,895 | 10/1992 | Doucet | 210/636 |
| 5,242,595 | 9/1993 | Morgart et al. | 210/636 |
| 5,244,585 | 9/1993 | Sugimoto | 210/798 |
| 5,344,565 | 9/1994 | Degen et al. | 210/636 |

*Primary Examiner*—Robert Popovics
*Attorney, Agent, or Firm*—D. Peter Hochberg; Mark Kusner

[57] ABSTRACT

A method for back-washing a submerged-type ceramic membrane separation apparatus is provided in which filtrate once removed from the apparatus and a chemical agent are forcibly supplied to filtrate passages in ceramic membrane filters to wash the ceramic membrane filters with the filtrate and with the chemical agent, wherein the water washing and chemical washing are carried out at a predetermined frequency ratio and for a predetermined time period, or wherein the frequency and time period of the chemical washing are determined on the basis of a transmembrane pressure difference, suction pressure or filtrate flux observed during a filtering operation performed by the membrane separation apparatus. This method makes it possible to avoid an excessive chemical washing, and to reduce the amounts of water and chemical agent and the time required for the chemical washing.

7 Claims, 5 Drawing Sheets

METHOD OF BACK-WASHING SUBMERGED-TYPE CERAMIC MEMBRANE SEPARATION APPARATUS

FIELD OF THE INVENTION

The present invention relates to methods for back-washing submerged-type ceramic membrane separation apparatus adapted for water treatment such as water purification and waste water treatment of sewage water, night soil and industrial waste water, and for concentration of sludge, separation of bacteria, desalination of sea water, and like treatments.

BACKGROUND OF THE INVENTION

A ceramic membrane separation apparatus of the type which is adapted to be submerged in treatment water contained in a water treatment vessel is well known as a solid-liquid separator for water treatment such as water purification and waste water treatment of sewage water, night soil and industrial waste water, or for concentration of sludge, separation of bacteria, desalination of sea water, or like treatments. Such ceramic membrane separation apparatus, for example, comprises a plurality of stacked membrane modules each having a plurality of tubular ceramic membrane filters, and filtrate suction pipes communicating with the inside of the tubular ceramic membrane filters. In this ceramic membrane separation apparatus, treatment water contained in the water treatment vessel is filtered through the ceramic membrane filters by the water pressure of the treatment water in the water treatment vessel or a suction pressure generated by a suction means connected to a filtrate suction pipe line, and the filtrate thus filtered is removed from the water treatment vessel. When scale, slime and other substances deposited on the surface of and inside of the ceramic membrane filters deteriorate the filtering performance of the apparatus during a prolonged operation, the ceramic membrane filters are chemically cleaned by immersing the entire membrane separation apparatus in a chemical agent in the water treatment vessel after the water is drained therefrom, or in an another vessel outside the water treatment vessel.

Though the chemical cleaning is indeed a highly effective cleaning method, deposited substances can otherwise be removed merely by washing with water to some extent. Therefore, the chemical agent is not necessarily required for every cleaning, and is undesirable in terms of cost.

A method for back-washing membrane filters is also known in which a chemical agent is forcibly supplied to filtrate passages inside the membrane filters and then permeated through the membrane filters from the filtrate passages to clean the membrane filters. In this method, however, the chemical agent flows through the filtrate passages in a state of plug flow and hence is liable to remain unreacted in the middle portion of the membrane filters. In addition, there is a tendency to use an excessive amount of an oxidizing agent such as sodium hypochlorite to enhance the cleaning effect. As a result, residual chemical agent in the filtrate passages comes out along with the filtrate when a filtering operation is resumed. The chemical agent contaminating the filtrate may affect adversely in the later steps of the water treatment process.

DISCLOSURE OF THE INVENTION

To solve the foregoing problems, it is an object of the present invention to provide a method for back-washing a submerged-type ceramic membrane separation apparatus, which is capable of cleaning the ceramic membrane filters thereof effectively and preventing a chemical agent used for chemical washing from contaminating filtrate when a filtering operation is resumed.

The present invention provides a method for back-washing a submerged-type ceramic membrane separation apparatus, comprising the step of forcibly supplying filtrate once removed from the apparatus and a chemical agent separately to filtrate passages in the ceramic membrane filters to wash the ceramic membrane filters with the filtrate and with the chemical agent, wherein water washing and chemical washing are carried out on the basis of a predetermined frequency ratio and a predetermined time period.

According to the above back-washing method, the ceramic membrane filters are washed with the filtrate for an appropriate period in the ordinary course of back-washing, and washed with the chemical agent at a predetermined time for an appropriate time period. In this back-washing operation, the ceramic membrane filters are washed with a small amount of the filtrate once removed from the apparatus to exfoliate deposit adhering to each membrane, and chemically washed with the chemical agent in an amount required to be distributed throughout the ceramic membrane filters. Thus, excessive chemical washing can be avoided, and the amounts of water and chemical agent used for the back-washing and the time required for the back-washing can be significantly reduced.

The present invention further provides a method for back-washing a submerged-type ceramic membrane separation apparatus, comprising the step of forcibly supplying filtrate once removed from the apparatus and a chemical agent to filtrate passages in the ceramic membrane filters to wash the ceramic membrane filters with the filtrate and with the chemical agent, wherein frequency and time period of the chemical washing are controlled on the basis of a transmembrane pressure difference, suction pressure or membrane filtrate flux observed during a filtering operation.

In accordance with this back-washing method, the ceramic membrane filters are washed with the filtrate in the ordinary course of the back-washing, and washed with the chemical agent at an appropriate time for an appropriate time period, depending on the degree of a change in the transmembrane pressure difference, suction pressure or filtrate flux. Thus, the frequency and time period of the chemical washing can be suitably determined, thereby the amounts of the filtrate and chemical agent and the time required for the back-washing can be reduced.

In the method for back-washing a submerged-type ceramic membrane separation apparatus according to the present invention, it is preferable to retain the forcibly supplied chemical agent in the filtrate passages for an appropriate time period.

By retaining the chemical agent in the filtrate passages for an appropriate time period, sufficient time is allowed for chemical reaction. Therefore, an effective chemical washing of the ceramic membrane filters is achieved.

Further, in the method for back-washing a submerged-type ceramic membrane separation apparatus according to the present invention, it is preferable to rinse the ceramic membrane filters with the filtrate or with a solution of a reducing agent after the chemical washing.

With this feature of the back-washing method, the chemical agent remaining in the ceramic membrane filters and in the filtrate passages can be forced out of the ceramic membrane filters by rinsing the membrane filters with the filtrate after the chemical washing. Where an oxidizing agent is used as the chemical agent, the oxidizing agent can be inactivated by rinsing with the reducing agent after the chemical washing. This prevents such a chemical agent as oxidizing agent in high concentration from coming out of the apparatus along with the filtrate when a filtering operation is resumed.

Still further, in the method for back-washing a submerged-type ceramic membrane separation apparatus according to the present invention, it is preferable to use an aqueous solution of an oxidizing agent selected from the group consisting of sodium hypochlorite, chlorine and chlorine dioxide in an available chlorine concentration of about 1 mg/l to about $10^4$ mg/l for the chemical washing.

By the chemical washing with the aqueous solution of the aforesaid oxidizing agent of an appropriate concentration, mainly organic deposit adhering to the membrane filters can be advantageously removed.

Yet further, in the method for back-washing a submerged-type ceramic membrane separation apparatus according to the present invention, it is preferable to use an aqueous solution of an acid or base selected from the group consisting of hydrochloric acid, sulfuric acid, nitric acid, oxalic acid, citric acid, and sodium hydroxide in a concentration of about 1 mg/l to about $10^4$ mg/l for the chemical washing.

By the chemical washing with the aqueous solution of the aforesaid acid or base of an appropriate concentration, organic and inorganic deposit adhering to the membrane filters can be advantageously removed.

Still further, in the method for back-washing a submerged-type ceramic membrane separation apparatus according to the present invention, it is preferable to use at least two kinds of chemical solutions including oxidizing agent solutions and acidic or basic solutions to carry out the chemical washing in multiple stages.

The membrane filters can be more effectively cleaned by the multi-stage chemical washing with at least two kinds of chemical solutions including oxidizing agent solutions and acidic or basic solutions.

DESCRIPTION OF THE PREFERRED EMBODIMENTS

With reference to the accompanying drawings, the present invention will be hereinafter described by way of examples.

The water treatment systems illustrated in FIGS. 1 and 3 to 5 are used, for example, for water purification of river water, lake water, ground water and the like, activated sludge treatment process for treating sewage water, night soil, industrial waste water and the like, concentration of sludge, separation of bacteria, and desalination of sea water. The submerged-type ceramic membrane separation apparatus separates turbidity, activated sludge, and flock coagulated with such coagulants as poly-(aluminium chloride) (PAC), aluminium sulfate, ferric chloride or poly-(ferric sulfate).

EXAMPLE 1

Figure 1:
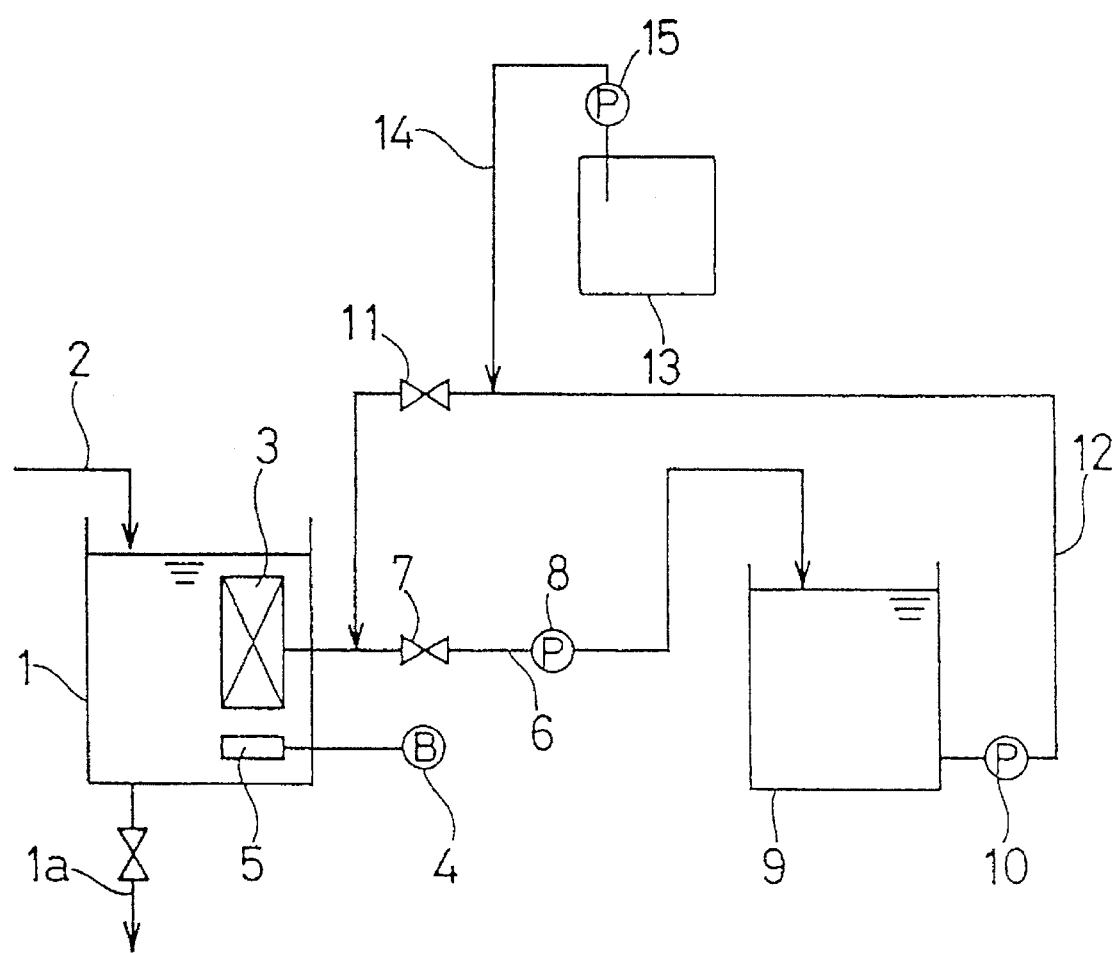
FIG. 1 is a schematic diagram illustrating a water treatment system to which is applied one embodiment of a back-washing method for membrane separation apparatus according to the present invention.

In FIG. 1, there is shown a water treatment system including a water treatment vessel 1 to which water to be treated is fed through a water feeding pipe line 2, a membrane separation apparatus 3 of external-pressure type which is submerged in the water contained in the water treatment vessel 1, an aerator 5 disposed below the membrane separation apparatus 3 and connected to a blower 4 which supplies aeration gas to the water, and a sludge drain pipe 1a disposed at the bottom of the water treatment vessel 1 for draining excess sludge.

The membrane separation apparatus 3 comprises a plurality of stacked membrane modules each having a plurality of tubular ceramic membrane filters which are connected to a filtrate suction pipe line 6 for communicating with the inside of the ceramic membrane filters, i.e., filtrate passages. A control valve 7 and a suction pump 8 are disposed intermediate the filtrate suction pipe line 6 which is led to a filtrate tank 9 provided outside the water treatment vessel 1.

The filtrate tank 9 communicates with a back-wash water feeding pipe line 12 provided with a back-wash pump 10 and a control valve 11. This back-wash water feeding pipe line 12 serves to forcibly supply filtrate pooled in the filtrate tank 9 to the inside of the membrane filters in the membrane separation apparatus 3. A chemical agent feeding pipe line 14 extending from a chemical agent vessel 13 communicates with the back-wash water feeding pipe line 12 at the midway thereof. A chemical agent feeding pump 15 disposed intermediate the chemical agent feeding pipe line 14 serves to forcibly supply a chemical agent contained in the chemical agent vessel 13 to the back-wash water feeding pipe line 12.

When this water treatment system is operated, the suction pump 8 is actuated with the control valve 7 being opened and with the control valve 11 being closed in a state where water to be treated is supplied to the water treatment vessel 1 through the water feeding pipe line 2. Thus, a negative pressure generated by the suction pump 8 is applied to the inside of the membrane filters in the membrane separation apparatus 3 through the filtrate suction pipe line 6 to filter the water in the water treatment vessel 1. Suspended matter remains in the water treatment vessel 1, while filtrate passing through the membrane filters into the filtrate suction pipe line 6 is fed to the filtrate tank 9. At this time, the blower 4 supplies aeration gas to the water treatment vessel 1 through the aerator 5, thereby generating bubbles and upward water stream which are supplied toward the membrane separation apparatus 3 to wash the surfaces of the membrane filters.

The membrane separation apparatus 3 is back-washed, when the filtration performance of the membrane filters deteriorates during prolonged operation, or regularly to prevent a decrease in separation efficiency. A control system such as having a timer is preferably employed for regular back-washing operations.

When the membrane separation apparatus 3 is washed with water, the feeding of the water to be treated to the water treatment vessel 1 is stopped, and the filtrate suction pump 8 is stopped with the control valve 7 being closed to stop the filtering operation of the membrane separation apparatus 3. Next, the back-wash pump 10 is actuated with the control valve 11 being opened to forcibly supply the filtrate pooled in the filtrate tank 9 to the passages of the membrane filters in the membrane separation apparatus 3 through the back-wash water feeding pipe line 12. At the same time, bubbles and upward water stream generated by aeration gas from the aerator 5 are supplied to the membrane separation apparatus 3, so that deposits adhering to the membrane filters are removed therefrom.

While the water washing is thus carried out by using the filtrate in appropriate intervals between filtering operations, chemical washing is carried out as required. In the chemical washing, the chemical agent feeding pump 15 is actuated in a state where the filtrate pooled in the filtrate tank 9 is forcibly supplied to the inside of the membrane filters in the membrane separation apparatus 3 through the back-washing water feeding pipe line 12 substantially in the same manner as the water washing. Thus, the chemical agent contained in the chemical agent vessel 13 is added to the filtrate being forcibly supplied through the back-wash water feeding pipe line 12 to prepare a solution of the chemical agent in an appropriate concentration in the back-wash water feeding pipe line 12. The chemical solution is fed into the membrane filters, and then retained therein for an appropriate time period to be permeated from the inside to the outside of the membrane filters, thereby chemically removing deposit adhering to each membrane.

Exemplary chemical agents for the chemical washing include solutions of such oxidizing agents as sodium hypochlorite, chlorine and chlorine dioxide, such acids as hydrochloric acid, sulfuric acid, nitric acid, oxalic acid and citric acid, and such bases as sodium hydroxide. In the case of the oxidizing agent solutions, the available chlorine concentration in the filtrate is between about 1 mg/l and about $10^4$ mg/l, preferably between about 10 mg/l and about $10^3$ mg/l. In the case of the acid and base solutions, the concentration of the acid or base in the filtrate is between about 1 mg/l and about $10^4$ mg/l.

The water washing and chemical washing are each carried out for a predetermined time period and with a predetermined frequency. The frequency ratio of the water washing to the chemical washing is at least 2 to 1. The time periods of the water washing and the chemical washing are preferably between about 0.5 seconds and about 1 minute and between about 10 seconds and about 5 minutes, respectively.

In accordance with this back-washing process, the chemical washing is carried out for an appropriate time period and with a predetermined frequency in addition to the water washing carried out in the ordinary course of the back-washing. Therefore, excessive chemical washing can be avoided. Deposit adhering to the membrane filters can be removed in the water washing process by using a small amount of filtrate once removed from the water treatment vessel, and the membrane filters can be further chemically washed with the chemical agent in an amount required to be distributed throughout the membrane filters in the chemical washing process. Therefore, the amounts of water and chemical agent to be used for the back-washing can be reduced. Such effective back-washing significantly reduces the total back-washing time and improves the filtration efficiency.

Figure 2:
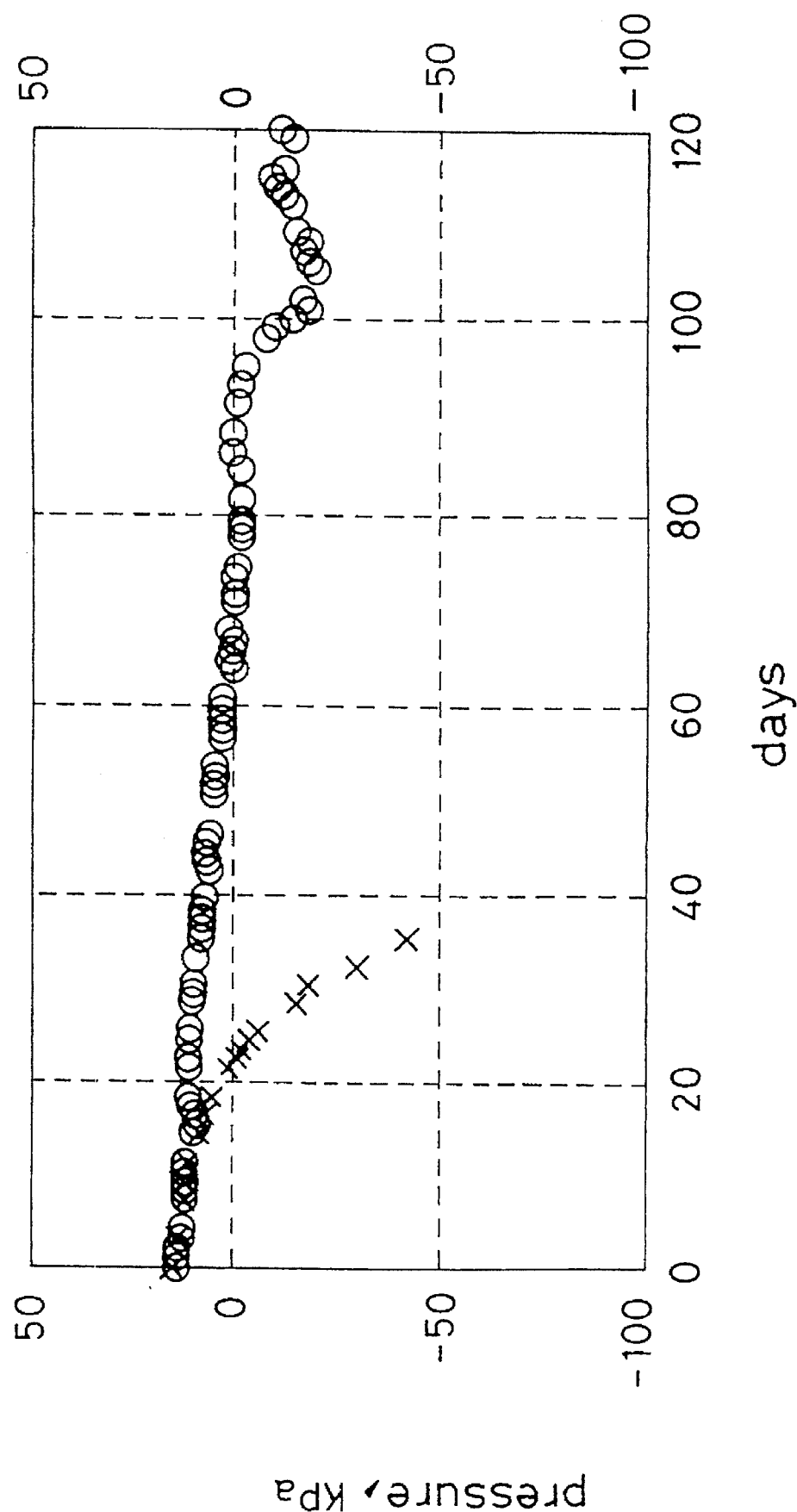
FIG. 2 is a graphical representation showing a cleaning effect obtained by the back-washing method for membrane separation apparatus described with reference to FIG. 1.

FIG. 2 is a graph for explaining the effect of the chemical washing, which shows the relationship of the suction pressure (KPa) versus the elapsed time (days) observed when the water to be treated is filtered through the membrane separation apparatus at a constant flow rate. In FIG. 2, the suction pressure observed after the membrane filters were back-washed with a sodium hipochlorite solution having an available chlorine concentration of 100 mg/l is plotted by o, and the suction pressure observed after the membrane filters were back-washed only with water is plotted by x. As can be understood from FIG. 2, the suction pressure observed after the chemical washing did not become so negative as that observed after the water washing. The duration in which the filtering capability of the apparatus remains suitable was extended to about four months or more after the chemical washing, while the duration was about one month after the water washing. This is because deposit adhering to the membrane filters and pipe lines was removed and slime deposition was prevented by the oxidation effect of the sodium hypochlorite solution.

Figure 3:
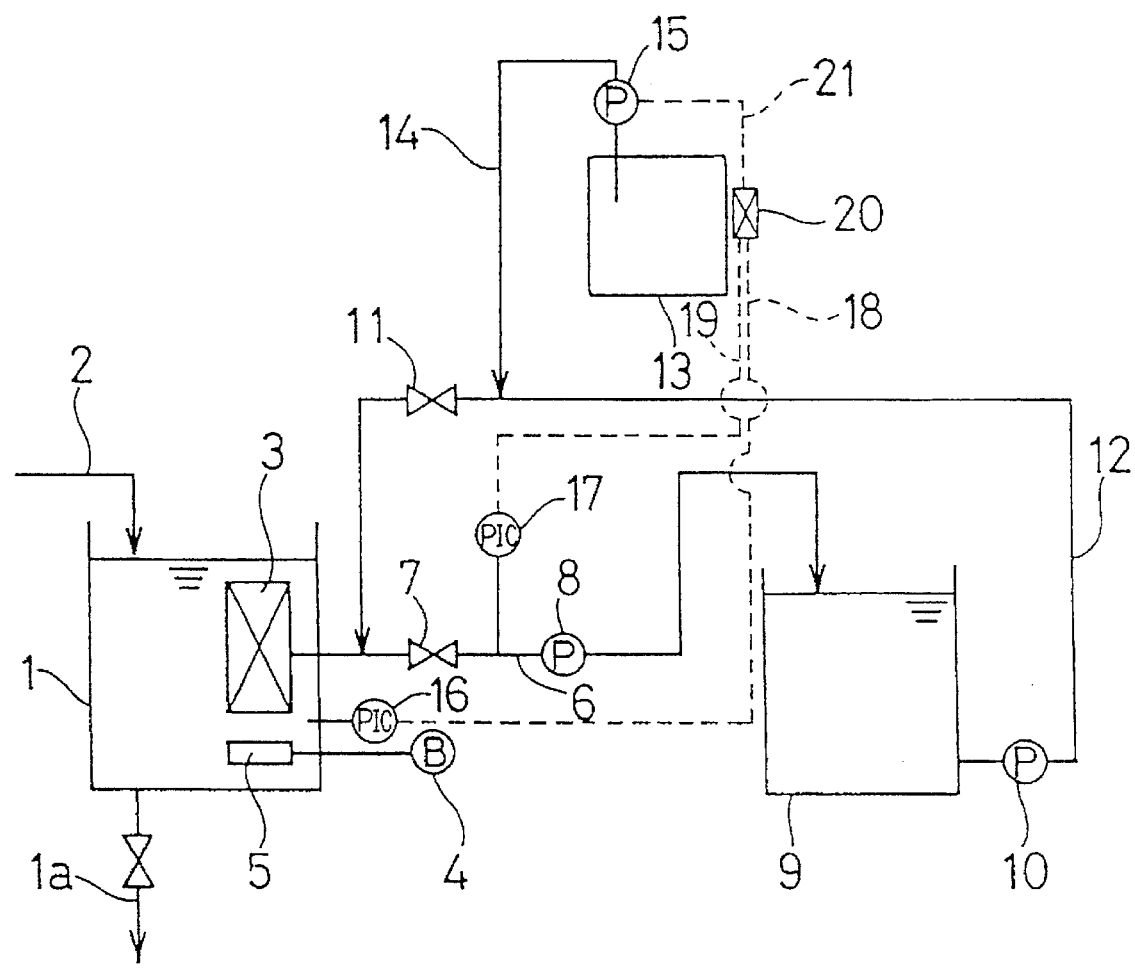
FIG. 3 is a schematic diagram illustrating a water treatment system to which is applied another embodiment of a back-washing method for membrane separation apparatus according to the present invention.
Figure 4:
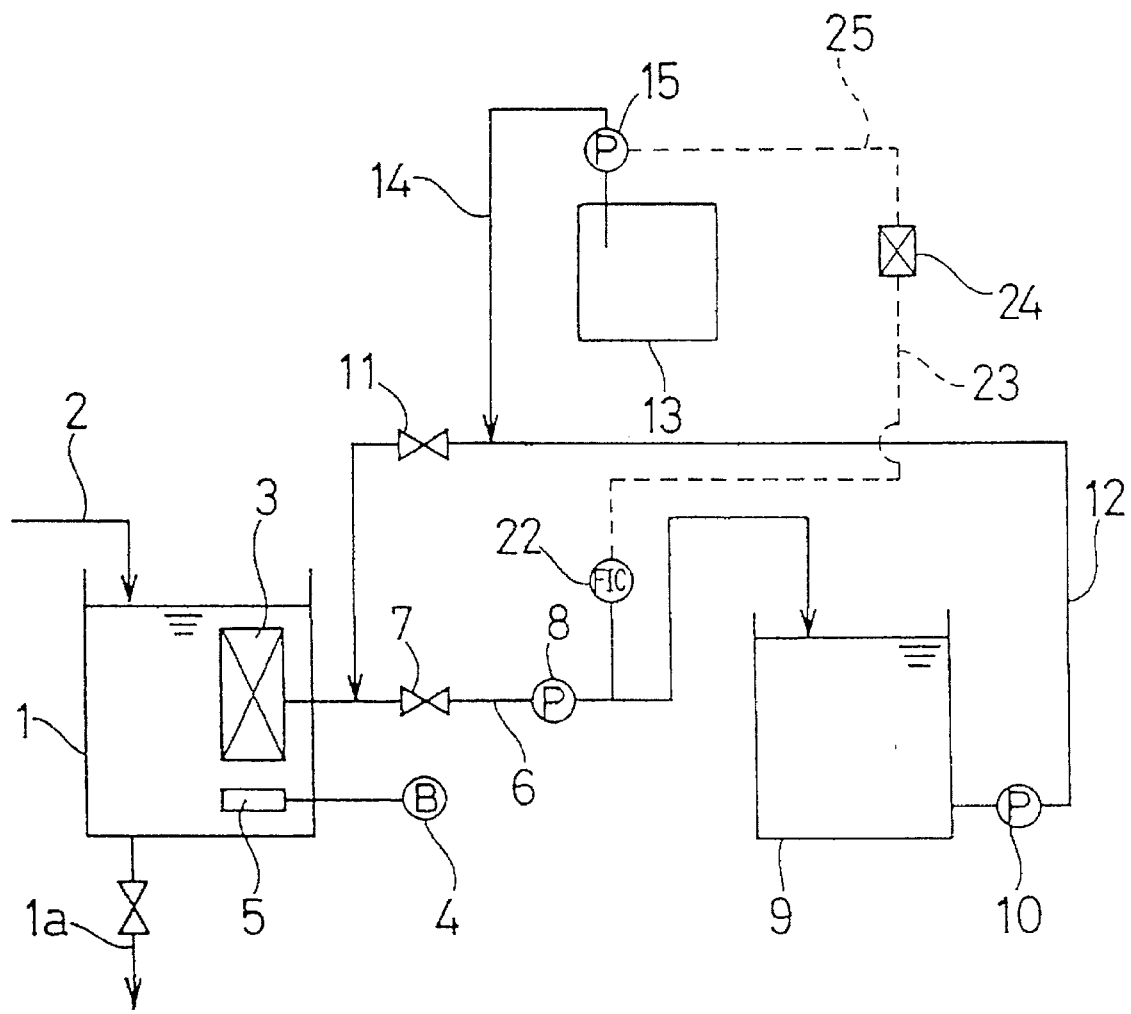
FIG. 4 is a schematic diagram illustrating a water treatment system to which is applied yet another embodiment of a back-washing method for membrane separation apparatus according to the present invention.
Figure 5:
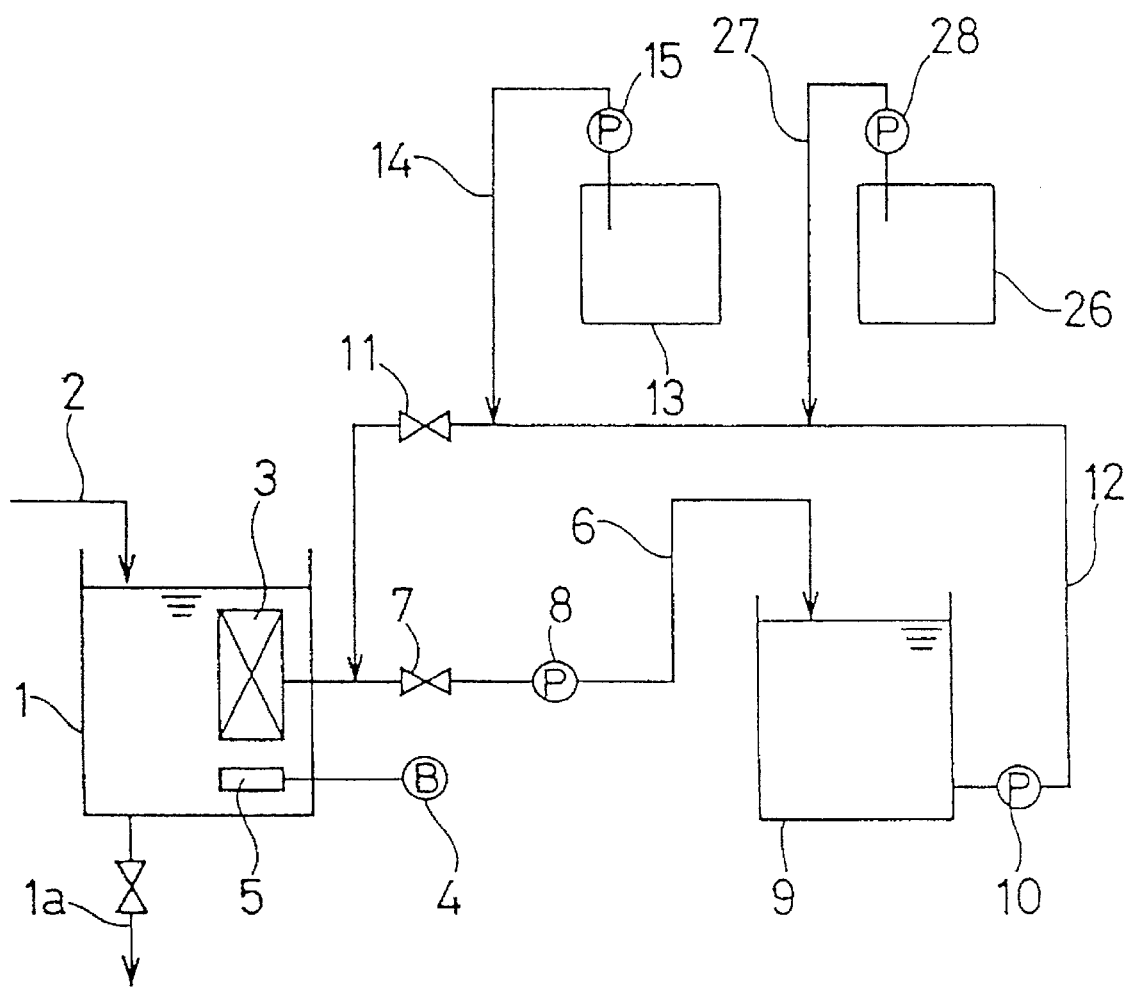
FIG. 5 is a schematic diagram illustrating a water treatment system to which is applied still another embodiment of a back-washing method for membrane separation apparatus according to the present invention.

Next, with reference to FIGS. 3 to 5, other examples of the back-washing method for a membrane separation apparatus according to the present invention will be described below. Since the structures of water treatment systems shown in FIGS. 3 to 5 are substantially the same as that shown in FIG. 1, like reference numerals are used to designate like parts throughout these figures, and the description on such parts is herein omitted. It is assumed that the membrane separation apparatus 3 is back-washed with water in regular intervals between filtering operations.

EXAMPLE 2

In FIG. 3, there is shown a water treatment system comprising a pressure gage 16 disposed in a water treatment vessel 1 for measuring the water pressure near the membrane surface of a membrane separation apparatus 3 and a pressure gage 17 disposed on the suction side of a suction pump 8 in a filtrate suction pipe line 6 for measuring the internal pressure of the filtrate suction pipe line 6. The pressure gages 16 and 17 are connected to a controller 20 via signal lines 18 and 19, respectively, and the controller 20 is connected to a chemical agent feeding pump 15 via a control line 21.

In accordance with this arrangement, the pressure gage 16 measures the water pressure P1 in the water treatment vessel 1, and the pressure gage 17 measures the internal pressure P2 during the filtering operation by the membrane separation apparatus 3. The pressure data thus obtained are sent to the controller 20 via the signal lines 18 and 19, and the pressure difference P1–P2 is recognized as a transmembrane pressure difference in the controller 20. At the next regular water washing process after the transmembrane pressure difference reaches a certain level, a control signal is sent to the chemical agent feeding pump 15 from the controller 20 via the control line 21. After receiving this control signal, the chemical agent feeding pump 15 is actuated for chemical washing.

Specifically, a back-wash pump 10 is actuated with a control valve 7 being closed and with a control valve 11 being opened, and feeds the filtrate pooled in a filtrate tank 9 to the membrane separation apparatus 3 via a back-wash water feeding pipe line 12 in substantially the same manner as in the regular water washing process. Then, a chemical agent is fed into the filtrate flowing through the back-wash water feeding pipe line 12 in an appropriate amount and for an appropriate time period which are optimized depending on the degree of an increase in the transmembrane pressure difference. Thus, the membrane separation apparatus 3 is chemically washed.

In accordance with this back-washing process, while the membrane separation apparatus 3 is washed with the filtrate in the ordinary course of back-washing, the chemical washing is carried out only at a necessary time which is determined on the basis of the change in the transmembrane pressure difference. Therefore, the frequency of the chemical washing is appropriately controlled with the amounts of water and chemical agent being significantly reduced, thus leading to an effective back-washing. Though, in this embodiment, the chemical feeding pump 15 is actuated in the next regular water washing process after the transmembrane pressure difference reaching the certain level, the chemical washing may be carried out immediately after the transmembrane pressure difference reaches the certain level by forcibly feeding the filtrate pooled in the filtrate tank 9 to the inside of membrane filters via the back-wash water feeding pipe line 12 and actuating the chemical pump 15 to feed a chemical agent.

In a modification of the aforesaid EXAMPLE 2, the water treatment system may exclude the pressure gage 16 disposed in the water treatment vessel 1. That is, the pressure gage 17 is disposed on the suction side of the suction pump 8 intermediate the filtrate suction pipe line 6 for measuring the internal pressure of the filtrate suction pipe line 6 and connected to the controller 20 via the signal line 19, and the controller 20 is connected to the chemical agent feeding pump 15 via control line 21. In this arrangement, the time when the chemical washing should be carried out is determined on the basis of a reduction in the suction pressure, and the chemical washing is carried out for an appropriate period depending on the degree of the reduction in the suction pressure. Like the aforesaid back-washing process, this process can also carry out the chemical washing with an appropriate frequency and reduce the amounts of water and chemical agent to be used for the back-washing, thereby realizing an efficient back-washing.

EXAMPLE 3

In FIG. 4, there is shown a water treatment system comprising a flow meter 22 disposed on the discharge side of a suction pump 8 intermediate a filtrate suction pipe line 6 for measuring the flow rate of filtrate in the filtrate suction pipe line 6, a controller 24 connected to the flow meter 22 via a signal line 23, and a chemical agent feeding pump 15 connected to the controller 24 via a control line 25.

With this arrangement, the flow meter 22 measures the flow rate of the filtrate flowing through the filtrate suction pipe line 6 during the filtering operation, performed by the membrane separation apparatus 3, and the flow rate data is sent to the controller 24 via the signal line 23 and recognized as a membrane filtrate flux by converted thereto. At the next regular water washing process after the membrane filtrate flux is reduced to a certain level, a control signal is sent to the chemical agent feeding pump 15 from the controller 24 via the control line 25. After receiving this control signal, the chemical agent feeding pump 15 is actuated for chemical washing. At this time, a chemical agent is supplied from the chemical agent feeding pipe line 14 in an appropriate amount and for an appropriate time period which are optimized depending on the reduction in the membrane filtrate flux thereby chemically washing the membrane separation apparatus 3.

In this arrangement, the time when the chemical washing should be carried out is determined on the basis of a reduction in the filtrate flux of the filtrate flowing though the filtrate suction pipe line 6. This back-washing process can also carry out the chemical washing with an appropriate frequency and reduce the amounts of water and chemical agent to be used for the back-washing, thus leading to an efficient back-washing.

EXAMPLE 4

In FIG. 5, there is shown a water treatment system comprising a chemical agent feeding pipe line 14 led from a chemical agent vessel 13 and a chemical agent feeding pipe line 27 led from a chemical agent vessel 26, both of which communicate with a back-wash water feeding pipe line 12. This arrangement makes it possible to feed a chemical agent contained in the chemical agent vessels 13 to the back-wash water feeding pipe line 12 through the chemical agent feeding pipe line 14 by a chemical agent feeding pump 15, and further to feed a chemical agent contained in the chemical agent vessels 26 to the back-wash water feeding pipe line 12 through the chemical agent feeding pipe line 27 by a chemical agent feeding pump 28.

In this water treatment system, a back-washing process using one of the chemical agent vessels, i.e., the chemical agent vessel 13 is exemplified here. An oxidizing agent of a sodium hypochlorite solution is contained in the chemical agent vessel 13. In the first step of back-washing a membrane separation apparatus 3, the oxidizing agent contained in the chemical agent vessel 13 is supplied to the filtrate flowing through the back-wash water feeding pipe line 12 via the chemical agent feeding line 14. Then, the oxidizing agent diluted into an appropriate concentration is forcibly supplied to the inside of membrane filters to chemically wash the membrane filters. In the second step, the membrane filters are rinsed only with filtrate not containing any chemical agent by forcibly supplying the filtrate thereto.

In accordance with this back-washing process, the membrane filters 3 are back-washed first with the oxidizing agent for chemical washing and then only with the filtrate for rinsing, so that the oxidizing agent remaining in and inside the membrane filters is forced out of the membrane filters. The oxidizing agent does not remain in or inside the membrane filters after the back-washing, unlike the conventional back-washing method. Accordingly, when a filtering operation is resumed, the oxidizing agent will not come out of the apparatus. This allows the provision of a membrane separation apparatus having an RO membrane vulnerable to an oxidizing agent for a farther water treatment at the downstream of this water treatment system.

EXAMPLE 5

In the water treatment system described in the aforesaid EXAMPLE 4 with reference to FIG. 5, an oxidizing agent of a sodium hypochlorite solution and a reducing agent of a sodium bisulfite solution, for example, are respectively contained in the chemical agent vessels 13 and 26.

In the first back-washing step, the oxidizing agent contained in the chemical agent vessel 13 is fed into the filtrate flowing through the back-wash water feeding pipe line 12 via the chemical agent feeding line 14 by actuating the chemical agent feeding pump 15. Then, the oxidizing agent diluted into an appropriate concentration is forcibly supplied to the inside of membrane filters to wash the membrane filters chemically. Thereafter, in the second back-washing step, the chemical agent pump 15 is stopped and the chemical agent pump 28 is actuated, so that the reducing agent contained in the chemical agent vessel 26 is fed into the back-wash water feeding pipe line 12 via the chemical agent feeding line 27. Then, the reducing agent diluted into an appropriate concentration is forcibly supplied to the inside of membrane filters to rinse the membrane filters.

In accordance with this back-washing process, the oxidizing agent remaining in and inside the membrane filters can be inactivated by the reducing agent and, therefore, the influence of the oxidizing agent can be eliminated without rinsing the membrane fillers with filtrate.

EXAMPLE 6

In the water treatment system described in the aforesaid EXAMPLE 4 with reference to FIG. 5, hydrochloric acid and an oxidizing agent of a sodium hypochlorite solution, for example, are respectively contained in the chemical agent vessels 13 and 26. In the first back-washing step, a chemical washing is carried out for an appropriate time period by using hydrochloric acid supplied from the chemical agent vessel 13, followed by a further chemical washing carried out for an appropriate time period by using the sodium hypochlorite solution supplied from the chemical agent vessel 26. Thereafter, in the second back-washing step, water rinsing is carried out by using only filtrate not containing any chemical agent.

In accordance with this back-washing process, inorganic deposit adhering to the membrane filters can be removed by hydrochloric acid, and organic deposit can be removed by the sodium hypochlorite solution. Thereafter, the sodium hypochlorite solution remaining in and inside the membrane filters is forced out of the membrane filters by the supplied filtrate to eliminate the oxidation effect of the sodium hypochlorite solution.

In the first back-washing step, the chemical washing by the sodium hypochlorite solution may precede the chemical washing by hydrochloric acid.

In the second back-washing step, a solution of such a reducing agent as sodium bisulfite may be used for rinsing in place of the filtrate to inactivate the sodium hypochlorite oxidizing agent.

Though, in the foregoing EXAMPLEs, each chemical solution is prepared in the back-washing water feeding pipe line by supplying the required chemical agent to the filtrate, the chemical solution may, of course, be preliminarily prepared in the chemical agent vessel and fed into the membrane separation apparatus for the chemical washing. Further, the back-washing method of the present invention is applicable to membrane separation apparatus of flat-membrane type and an internal-pressure type, though the membrane separation apparatus of an external-pressure type having tubular ceramic membrane filters is used in the foregoing EXAMPLEs of the present invention.

As has been described, the present invention provides an effective method for back-washing membrane filters which makes it possible to avoid an excessive chemical washing and to reduce the amounts of water and chemical agent to be used for back-washing. This is because the membrane filters are washed with filtrate in the ordinary course of back-washing, and washed with a chemical agent for a predetermined time period and at a predetermined frequency ratio, or otherwise for an appropriate time period and at an appropriate time which are determined on the basis of a trans-membrane pressure difference, suction pressure or filtrate flux. As a result, the efficient back-washing process reduces the frequency and total time required for the back-washing and, therefore, increases the filtration efficiency and filtering duration of the membrane separation apparatus. Hence, the maintenance and operation management of the membrane separation apparatus can be facilitated. Further, the chemical agent is retained in the membrane filters for the chemical washing for a time period sufficient to allow a chemical reaction to be fully achieved, so that the membrane filters can be effectively washed. Still further, in the chemical washing process, the membrane filters are first washed with a chemical agent such as an oxidizing agent and then rinsed with filtrate or with a reducing agent. Accordingly, such chemical agent is prevented from coming out of the apparatus along with filtrate when a filtration operation is resumed. Therefore, a membrane separation apparatus such as having an RO membrane vulnerable to oxidizing agents can be utilized at the downstream of the water treatment system.

What is claimed is:

1. A method for back-washing a ceramic membrane separation apparatus adapted to be submerged in treatment water contained in a water treatment vessel, said method comprising the step of:

forcibly supplying filtrate from the apparatus and a chemical agent, separately, to filtrate passages in ceramic membrane filters to wash the ceramic membrane filters with the filtrate during a water washing and to wash the ceramic membrane filters with the chemical agent during a chemical washing, wherein the water washing and the chemical washing are carried out on the basis of a predetermined frequency ratio and a predetermined time period, said time period of the water washing being between approximately 0.5 seconds and 60 seconds, in order to forcibly supply the filtrate to the filtrate passages to provide an applied pressure acting on the ceramic membrane filters, and said time period of the chemical washing being between approximately 10 seconds and 300 seconds, in order for the chemical agent to be forcibly supplied to the filtrate passages to thoroughly permeate the ceramic membrane filters.

2. A method for back-washing a ceramic membrane separation apparatus as set forth in claim 1, wherein, when the chemical washing is carried out, the forcibly supplied chemical agent is retained in the filtrate passages for a time period sufficient to allow a chemical reaction to occur between said chemical agent and any deposits on a surface of the ceramic membrane filter.

3. A method for back-washing a ceramic membrane separation apparatus as set forth in claim 1, wherein, after the chemical washing, the ceramic membrane filters are rinsed with the filtrate or with a solution of a reducing agent to remove any chemical agent remaining in the membrane filters from the chemical washing.

4. A method for back-washing a ceramic membrane separation apparatus as set forth in claim 3, wherein said reducing agent is a sodium bisulfate solution.

5. A method for back-washing a ceramic membrane separation apparatus as set forth in claim 1, wherein the chemical washing is carried out using an aqueous solution of an oxidizing agent selected from the group consisting of sodium hypochlorite, chlorine and chlorine dioxide in an available chlorine concentration of between about 1 mg/l and about $10^4$ mg/l.

6. A method for back-washing a ceramic membrane separation apparatus as set forth in claim 1, wherein the chemical washing is carried out using an aqueous solution of an acid or base selected from the group consisting of hydrochloric acid, sulfuric acid, nitric acid, oxalic acid, citric acid, and sodium hydroxide in a concentration of between about 1 mg/l and about $10^4$ mg/l.

7. A method for back-washing a ceramic membrane separation apparatus as set forth in claim 1, wherein the chemical washing is carried out in multiple stages using at least two kinds of chemical agent solutions selected from the group consisting of oxidizing agent solutions, acid solutions and base solutions.

* * * * *